(12) United States Patent
Gomi

(10) Patent No.: US 6,947,082 B2
(45) Date of Patent: Sep. 20, 2005

(54) IMAGE-TAKING APPARATUS AND IMAGE-TAKING METHOD

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 692 days.

(21) Appl. No.: 10/133,668

(22) Filed: Apr. 26, 2002

(65) Prior Publication Data

US 2002/0158973 A1 Oct. 31, 2002

(30) Foreign Application Priority Data

Apr. 27, 2001 (JP) .......................................... 2001-133163

(51) Int. Cl.$^7$ ............................................. H04N 5/262
(52) U.S. Cl. ................................ 348/240.2; 348/230.1; 348/333.03
(58) Field of Search ........................ 348/240.2, 240.99, 348/230.1, 312, 317, 294, 333.03, 333.09, 240.3; 382/300

(56) References Cited

U.S. PATENT DOCUMENTS

| | | | | |
|---|---|---|---|---|
| 4,910,599 | A | * | 3/1990 | Hashimoto ............... 348/240.2 |
| 5,243,433 | A | * | 9/1993 | Hailey |
| 6,491,628 | B1 | * | 12/2002 | Kobayashi ................... 348/65 |
| 6,542,201 | B1 | * | 4/2003 | Song et al. ............ 348/240.99 |
| 2003/0086007 | A1 | * | 5/2003 | Sasai ....................... 348/240.2 |
| 2003/0103145 | A1 | * | 6/2003 | Ejima et al. ............. 348/240.3 |
| 2003/0122946 | A1 | * | 7/2003 | Nishino .................... 348/240.2 |
| 2003/0174220 | A1 | * | 9/2003 | Ito .......................... 348/240.2 |
| 2004/0095486 | A1 | * | 5/2004 | Yamamoto et al. ...... 348/240.2 |

FOREIGN PATENT DOCUMENTS

| | | |
|---|---|---|
| JP | 06-350933 | 12/1994 |
| JP | 09-163245 | 6/1997 |
| JP | 09-224196 | 8/1997 |
| JP | 63-094232 | 4/1998 |
| JP | 2000-295530 | 10/2000 |

* cited by examiner

*Primary Examiner*—Aung Moe
(74) *Attorney, Agent, or Firm*—Straub & Pokotylo; John C. Pokotylo

(57) ABSTRACT

A system controller controls a solid-state image sensor, and performs read-out at a predetermined subsampling ratio. In the event that the size of the image-taking area and the subsampling ratio do not agree, the system controller executes image size conversion processing with a digital processing unit, and converts the image size to an image size corresponding to a request from a peripheral device unit. Also, the system controller performs changing of the image-taking area following ending of the reading out from the solid-state image sensor, thereby obtaining normal frame signals. Accordingly, even in the event that zooming is performed by changing the subsampling ratio, zooming operations can be performed with an arbitrary zooming ratio, and reading out of the image-taking information is made to be suitable.

24 Claims, 18 Drawing Sheets

ZOOM RATIO:X2

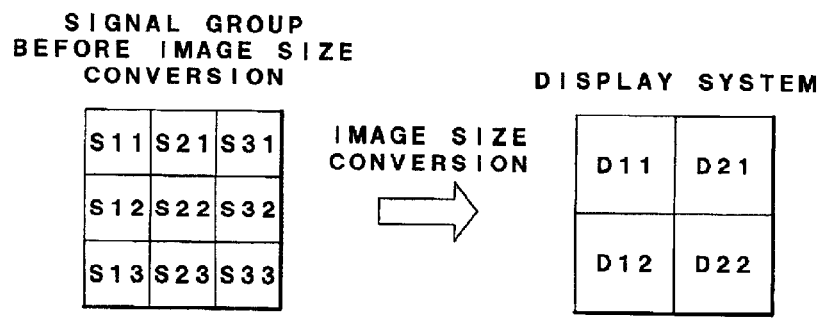
FIG.3A
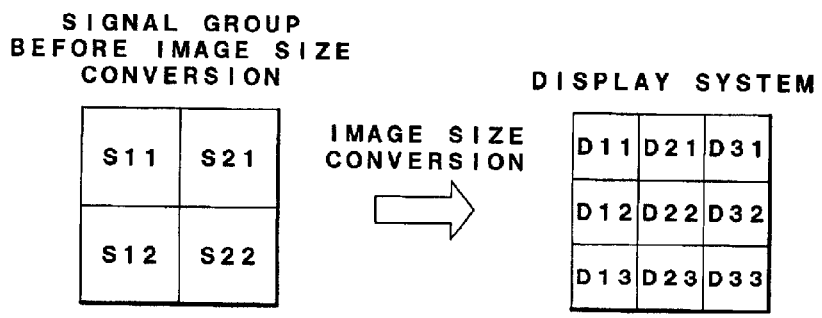
FIG.3B
FIG.4
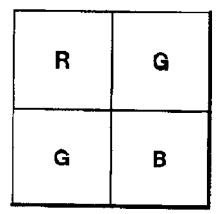

IMAGE-TAKING APPARATUS AND IMAGE-TAKING METHOD

This application claims benefit of Japanese Application No. 2001-133163 filed in Japan on Apr. 27, 2001, the contents of which are incorporated by this reference.

BACKGROUND OF THE INVENTION

1. Field of the Invention

The present invention relates to an image-taking apparatus and image-taking method, suitably used with an electronic zoom image-taking system using a high-resolution image-taking apparatus.

2. Description of the Related Art

In recent years, electronic image-taking apparatus, such as electronic still cameras or the like, wherein a subject image is converted into electric signals by a photo-electric converter such as a CCD (charge-coupled device), subjected to predetermined digital signals processing, and then recorded in a recording medium such as a memory card or the like, are coming into widespread use. Some of the electronic image-taking apparatus have optical zoom functions, or electronic zoom functions wherein the subject image can be enlarged or reduced electronically, in order to deal with the multi-functionality in recent years.

Electronic zoom functions enable image signals for recording which can be recorded by an electronic camera, or image signals recorded in a recording medium, to be subjected to image processing wherein a part of the image is electrically enlarged, and the enlarged image is displayed on the entire screen area on a display screen of an image display unit.

Using this function allows an image wherein only a part of the image is enlarged to be obtained (photographed and/or recorded) or reproduced, aside from the image having a predetermined photography range stipulated by the photography optical system of the electronic camera.

Now, in recent years, the increase in the number of pixels of solid-state image sensors for still image taking has been marked. In the event of attempting to apply such solid-state image sensors for still image taking to moving images, a great amount of time is required for reading out all the pixels. Accordingly, subsampling scanning may be performed, taking into consideration a match with the image size of the display system.

Further, Japanese Unexamined Patent Application Publication No. 2000-295530 discloses a proposal for a method for performing electronic zooming by changing the subsampling ratio. FIGS. 1A and 1B are explanatory diagrams for describing the reading out according to this proposal. FIG. 1A illustrates reading out when in the normal mode, and FIG. 1B illustrates reading out when in the zoom mode.

In the normal mode, every other pixel of the solid-state image sensor is read out. For example, in the range within the heavy border shown in FIG. 1A, the signals of the pixels filled in are read out. That is to say, by performing reading out with a subsampling ratio of 2, wherein every other pixel is read out from an 8×8 vertical and horizontal range so as to read out signals for 4×4 pixels, the number of pixels read out can be reduced, thereby shortening the read-out time and the signal processing time.

Conversely, in the zoom mode, the continuous 4×4 pixels at the center of the range with the heavy border of 8×8 pixels (the filled in portion) are read out. That is to say, in this case, the center portion of the range with the heavy border (the portion filled in) can be enlarged and displayed, by performing reading out with a subsampling ratio of 1. Moreover, the number of pixels read out is the same as with the normal mode, so the read-out time and the signal processing time may be made to be the same as with the normal mode, thereby standardizing signal processing.

However, with the proposal in Japanese Unexamined Patent Application Publication No. 2000-295530, the subsampling ratio which is applicable in the zoom mode is determined according to the maximum subsampling ratio. For example, in the example in FIGS. 1A and 1B, the solid-state image sensor only has twice the number of pixels in both the vertical and horizontal directions of the number of pixels read when in the normal mode, so the maximum subsampling ratio is also 2. Accordingly, the subsampling ratio at the time of the zoom mode is fixed at 1. Further, there has also been the problem that only zoom operations wherein the zoom ratio is an integer (2, in the case of FIGS. 1A and 1B) are performed.

Also, the read-out range of the solid-state image sensor may be changed due to transition to the zoom mode, etc. In this case, in the event that the read-out area changes while performing read-out scanning, the read-out line from the scanning of the area before the change and the read-out line from the scanning of the area following the change are both simultaneously read out, which has been a problem in that suitable image-taking information cannot be obtained.

SUMMARY OF THE INVENTION

Accordingly, it is an object of the present invention to provide an image-taking apparatus and image-taking method wherein zooming operations at an arbitrary zoom ratio can be performed even in the case of electronic zooming using subsampled reading out, and wherein suitable taken images can be obtained by the read-out of image-taking information from a solid-state image sensor being made suitable.

To this end, according to a first aspect of the present invention, an image-taking apparatus comprises: a solid-state image sensor for performing image-taking with a plurality of photo-electric converters arrayed in a two-dimensional array; a first read-out control unit which reads out from the photo-electric converters in a predetermined image-taking area, for performing reading out at a fixed subsampling ratio according to the size of the image-taking area as to a plurality of set image-taking areas, thereby outputting images of each of the set image-taking areas at the same image size; a second read-out control unit which reads out from the photo-electric converters in a predetermined image-taking area, for performing reading out at the fixed subsampling ratio as to a predetermined image-taking area of a size that is different from those of the plurality of set image-taking areas; and an image size conversion processing unit for converting the image size of an image obtained by the second read-out control unit to the same image size as an image obtained by the first read-out control unit.

Also, according to a second aspect of the present invention, an image-taking apparatus comprises: a solid-state image sensor for performing image-taking with a plurality of photo-electric converters arrayed in a two-dimensional array; first read-out means which read out from the photo-electric converters in a predetermined area image-taking, for performing reading out at a fixed subsampling ratio according to the size of the image-taking area as to a plurality of set image-taking areas, thereby outputting images of each of the set image-taking areas at the same image size; second read-out means which read out from the photo-electric converters in a predetermined image-taking area, for performing reading out at the fixed subsampling ratio as to a predetermined image-taking area of a size that is different from those of the plurality of set image-taking areas; and image size converting means for converting the image size of an image obtained by the second read-out means to the same image size as an image obtained by the first read-out means.

Further, according to a third aspect of the present invention, an image-taking method comprises: a step of taking images with plurality of photo-electric converters arrayed in a two-dimensional array; a step of reading out from the photo-electric converters in a predetermined image-taking area, in a normal mode, for performing reading out at a fixed subsampling ratio according to the size of the image-taking area as to a plurality of set image-taking areas, thereby outputting images of each of the set image-taking areas at the same image size; a step of reading out from the photo-electric converters in a predetermined image-taking area, in a zoom mode, for performing reading out at the fixed subsampling ratio as to a predetermined image-taking area of a size that is different from those of the set plurality of image-taking areas; and a step of converting the image size of an image obtained by reading out in the zoom mode to the same image size as an image obtained by reading out in the normal mode.

The above and other objects, features and advantages of the invention will become more clearly understood from the following description referring to the accompanying drawings.

BRIEF DESCRIPTION OF THE DRAWINGS

FIGS. 3A and 3B are explanatory diagrams for describing image size conversion processing at a digital processing unit 4 shown in FIG. 2;

FIG. 4 is an explanatory diagram illustrating an example of a primary color Bayer array;

DESCRIPTION OF THE PREFERRED EMBODIMENTS

Figure 1A:
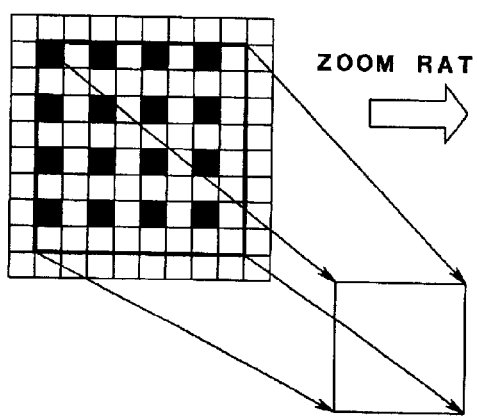
FIGS. 1A and 1B are explanatory diagrams describing the zooming operation in the Related Art.
Figure 1B:
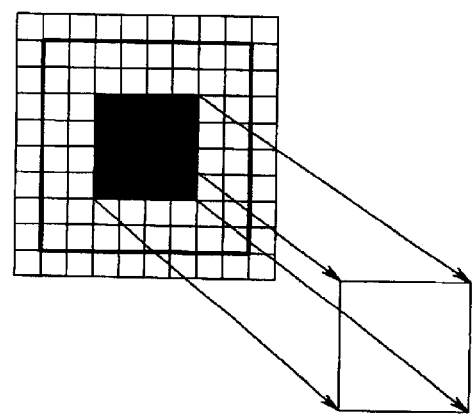
Figure 2:
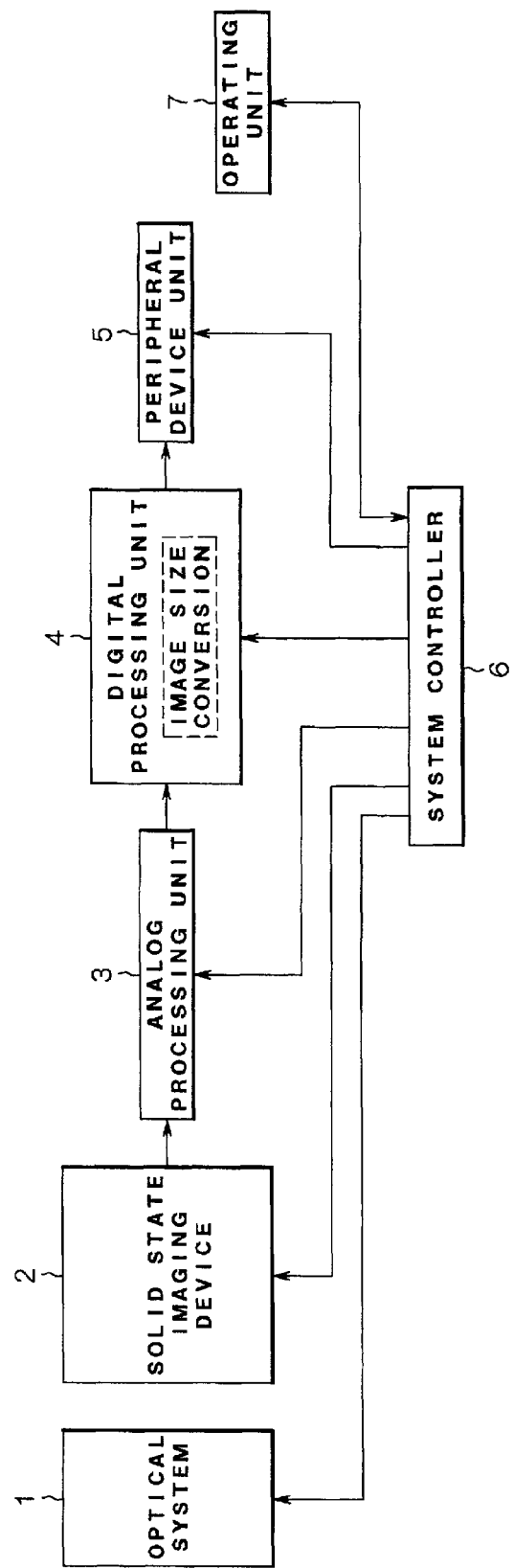
FIG. 2 is a block diagram illustrating an image-taking apparatus according to a first embodiment of the present invention.

The following is a detailed description of embodiments of the present invention, with reference to the drawings. FIG. 2 is a block diagram illustrating an image-taking apparatus according to a first embodiment of the present invention.

The present embodiment is an arrangement enabling zooming operations at an arbitrary zoom ratio to be performed even in the case of electronic zooming using sub-sampled reading out.

In FIG. 2, and optical system 1 formed of an image-taking lens, optical viewfinder, etc., reads in an optical image from the subject, and guides this to the incident face of a solid-state image sensor 2. The solid-state image sensor 2 is configured of multiple photo-electric converters arrayed in a two-dimensional array, such that an arbitrary area of the photo-electric converters (hereafter referred to as "image-taking area") can be read out at an arbitrary subsampling ratio and output. For example, an X-Y address type solid-state image sensor such as a CMOS sensor or the like can be used as the solid-state image sensor 2.

Also, a solid-state image sensor wherein decoder circuits are used as the horizontal and vertical scanning circuits can be employed. Also, the configuration using that the shift register can be used for the scanning circuits, such as an arrangement employing the method for scanning and sub-sampling scanning of an arbitrary range in the scope disclosed in Japanese Unexamined Patent Application Publication No. 6-350933 and Japanese Unexamined Patent Application Publication No. 9-163245.

Signals from the solid-state image sensor 2 are supplied to an analog processing unit 3. The analog processing unit 3 subjects that input signals to predetermined signal processing, such as signal amplification processing and the like, converts the signals into digital signals, and outputs these to a digital processing unit 4. The digital processing unit 4 subjects the input signals to predetermined digital signal processing, such as image size conversion, color signal generation processing, matrix conversion processing, etc. The digital processing unit 4 stores the digitally processed signals in memory, as necessary. Note that image size conversion processing is processing wherein a signal group is made to match the image size requested from a display system or recording system.

FIGS. 3A and 3B are explanatory diagrams illustrating image size conversion processing at the digital processing unit 4 shown in FIG. 2. FIG. 3A illustrates one example of a case of converting a 3×3 signal group that has been read out from the solid-state image sensor and subjected to the various types of processing, into a display system 2×2 image size. Also, FIG. 3B illustrates one example of converting a 2×2 signal group into a display system 3×3 image size.

In the event of converting a signal group of 3×3 pixels before image size conversion processing, into a display system 2×2 pixel signal group, the digital processing unit 4 uses, for example, computation according to the following Expressions (1) through (4). That is to say, a signal D11 of the display system is obtained by computation of signals S11 through S22 of four original pixels in the following Expression (1), i.e., by averaging the four pixels. In the same way, the signals D12 through D22 of the display system are obtained by computation with the following Expressions (2) through (4), respectively.

$$D11 = (S11+S21+S12+S22)/4 \quad (1)$$

$$D21 = (S21+S31+S22+S32)/4 \quad (2)$$

$$D12 = (S12+S22+S13+S23)/4 \quad (3)$$

$$D22 = (S22+S32+S23+S33)/4 \quad (4)$$

Also, in the event of converting a signal group of 2×2 pixels before image size conversion processing, into a display system 3×3 pixel signal group, the digital processing unit 4 uses, for example, computation according to the following Expressions (5) through (13). That is, the signals S11 for one original pixel is used as it is for the display system signal D11, and the average of two original pixels S11 and S21 (see Expression (6)) are used for the display system signal D21. In the same way, the display system signals D31 through D33 are obtained by computation of the following Expressions (7) through (13).

$$D11 = S11 \quad (5)$$

$$D21 = (S11+S21)/2 \quad (6)$$

$$D31 = S21 \quad (7)$$

$$D12 = (S11+S12)/2 \quad (8)$$

$$D22 = (S11+S21+S12+S22)/4 \quad (9)$$

$$D32 = (S21+S22)/2 \quad (10)$$

$$D13 = S12 \quad (11)$$

$$D23 = (S12+S22)/2 \quad (12)$$

$$D33 = S22 \quad (13)$$

Also note that image size conversion methods are not restricted to the above-described Expressions (1) through (13), and that various types of methods may be conceived taking into consideration the image quality, processing load, and so forth.

Also, depending on the processing method, the image size conversion processing may be performed before other digital processing, after the other digital processing has all ended, or partway through.

The signal subjected to digital processing at the digital processing unit 4 are sent to a peripheral device unit 5. The peripheral device unit 5 includes, for example, a display unit, recording unit, etc. An operating unit 7 has various types of unshown operating Keys, and is a range such that turning the electric power source on and off, setting modes, zooming, and so forth, can be instructed to a system controller 6, according to operations made by an operator.

The system controller (CPU) 6 centrally controls the components. In the present embodiment the system controller 6 controls the read-out of the solid-state image sensor 2 at the time of zooming operations, while controlling a the digital processing unit 4 depending on the zoom ratio, thereby carrying out image size conversion processing. That is, the system controller 6 changes the subsampling ratio and read-out range of the solid-state image sensor 2, and in the event that the desired zoom ratio cannot be obtained by changing the subsampling ratio alone, changes the subsampling ratio, and also executes image size conversion processing.

Also, besides operating an unshown zoom switch in the operating unit 7, the operator can also generate zoom request information for obtaining a desired zoom ratio by visual line detecting unit provided within a viewfinder.

Figure 5:
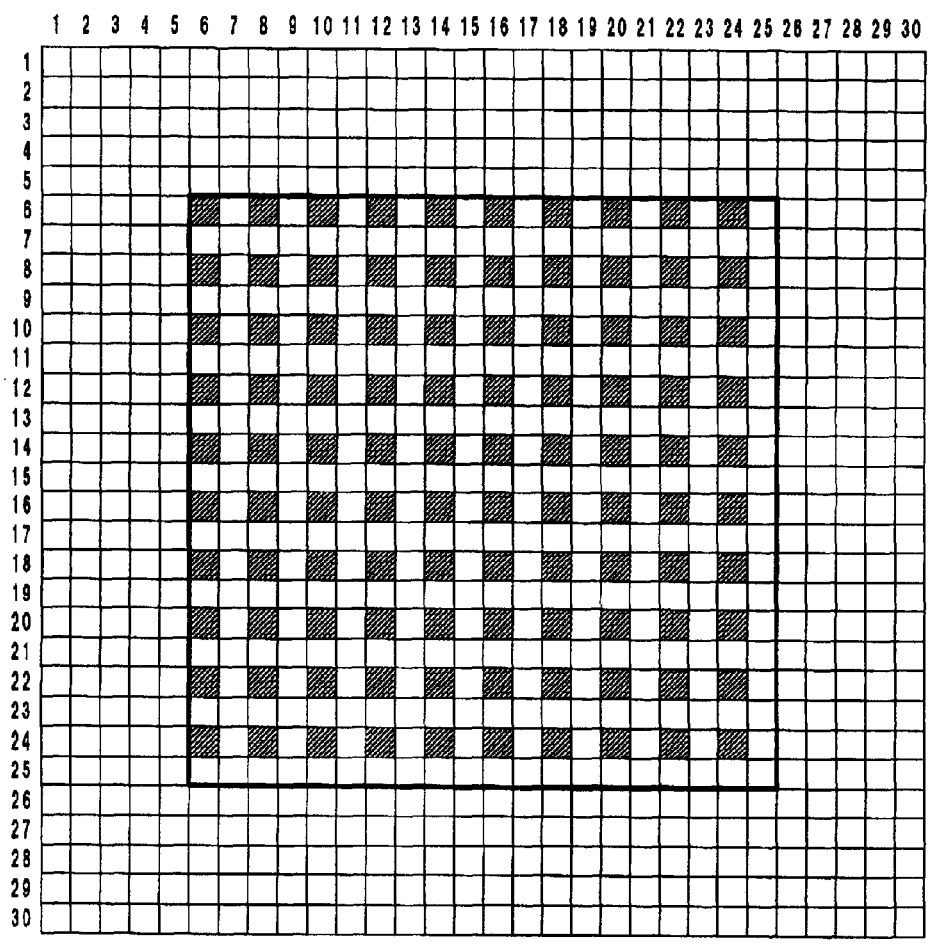
FIG. 5 is an explanatory diagram illustrating pixel read-out when in a zoom mode.
Figure 6:
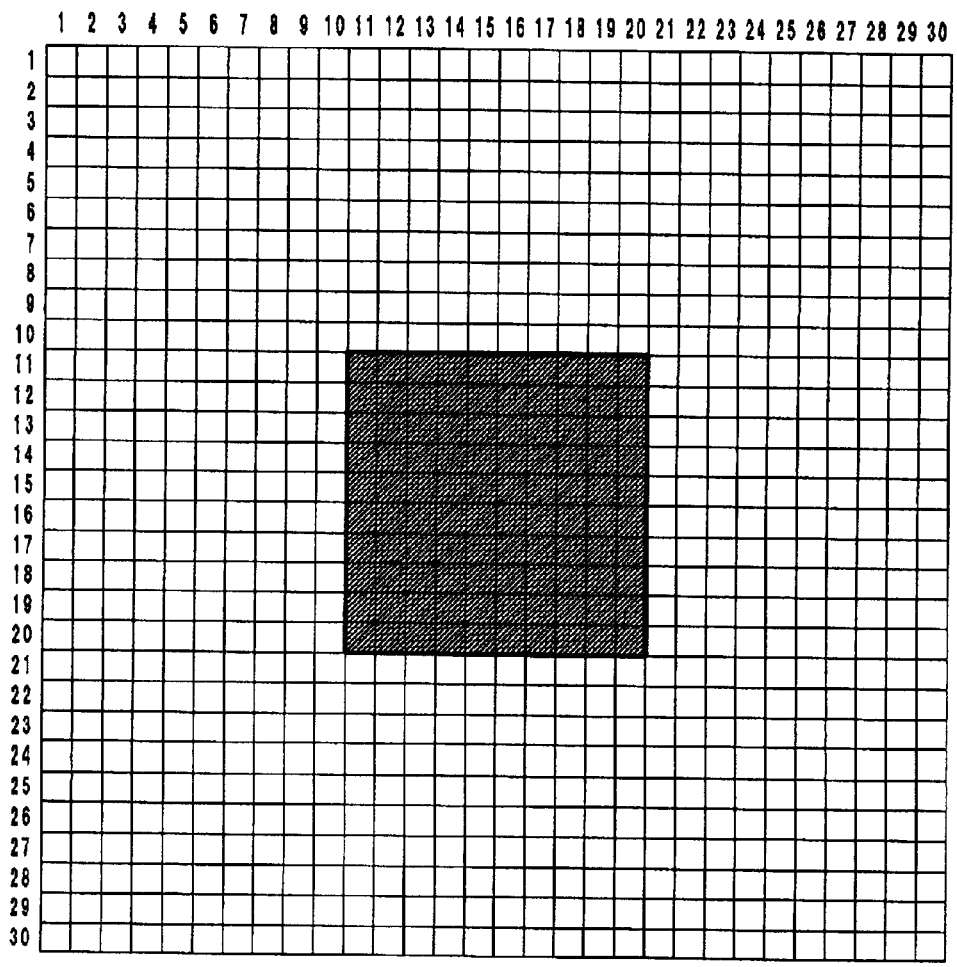
FIG. 6 is an explanatory diagram illustrating pixel read-out when in the zoom mode.
Figure 7:
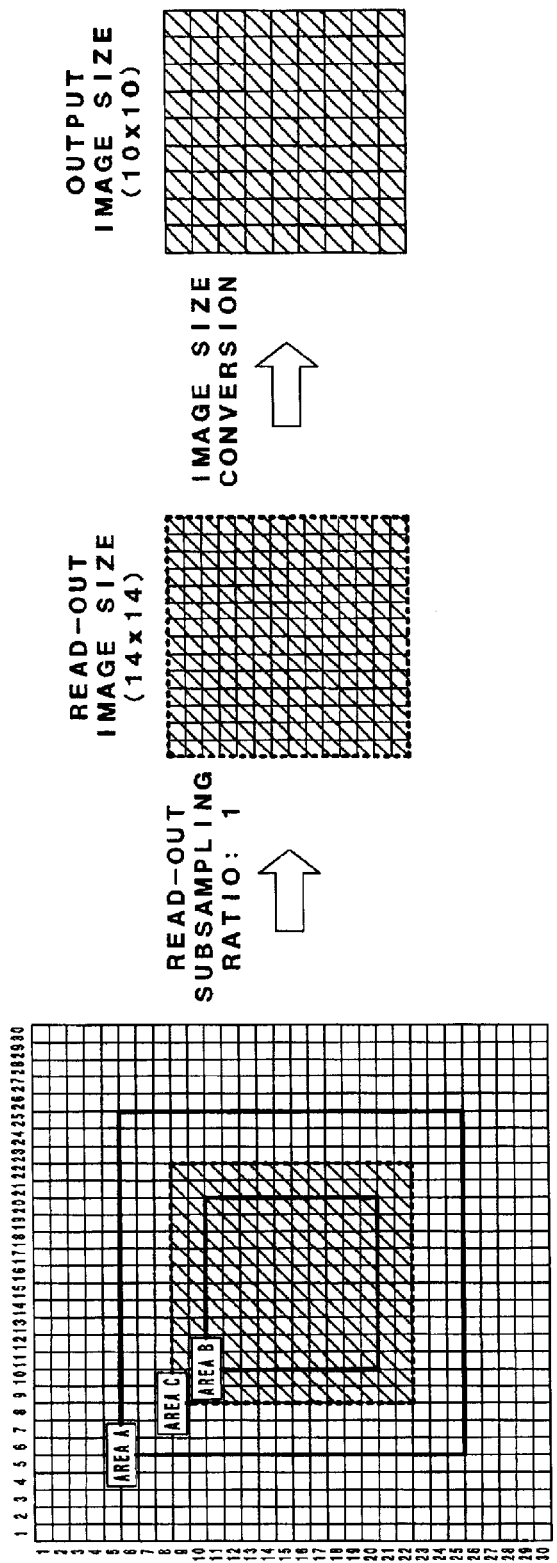
FIGS. 7A through 7C are explanatory diagrams illustrating pixel read-out when in the zoom mode.

Next, the operations of an embodiment configured thus will be described with reference to FIGS. 4 through 7C. FIG. 4 is an explanatory diagram illustrating the color filter array with reference to an example of a primary color Bayer array, and FIGS. 5 and 6 are explanatory diagrams illustrating pixel read-out when in a zoom mode. Note that generally, the number of photo-electric converter pixels of the solid-state image sensor 2 is set to (640×480 pixels (VGA)) or higher, but in this example, an arrangement of 30×30 pixels shown by the grid in FIGS. 5 and 6 will be used for the number of pixels of the photo-electric converter of the solid-state image sensor 2, to simplify the description.

Also note in the event that the solid-state image sensor is a monochromatic device, one photo-electric converter corresponds to one pixel. In the case of a color device, a basic unit wherein multiple color filters necessary for generating color signals are layered on the photo-electric converter can be thought of as corresponding to one pixel in FIGS. 5 and 6. FIG. 4 illustrates the arrangement of color filters in a primary color Bayer array serving as such the basic unit, showing an example configured of two green (G) filters and one each of red (R) and blue (B) filters.

The hatched pixels in FIGS. 5 and 6 indicate the pixels for reading out. That is, in the example in FIG. 5, this indicates that the image-taking area of 20×20 pixels indicated by the heavy border is read out with a subsampling ratio of 2, wherein every other pixel is read out in both the horizontal and vertical directions. Also, in the example in FIG. 6, this indicates that the image-taking area of 10×10 pixels indicated by the heavy border is read out with a subsampling ratio of 1. That is, in the example in FIG. 6, an image with twice the zoom of the example in FIG. 5 is obtained. In both FIG. 5 and FIG. 6, the number of pixels to be read out is 10×10 pixels, and in either case, the pixels signals read out can be displayed as an image by common signal processing.

Now, let us say that the image size requested by an unshown display system or recording system of the peripheral device unit 5 is 10×10 pixels. For example, the system controller 6 drives and controls the solid-state image sensor 2 so as to perform reading out with a subsampling ratio of two, indicated by the hatched portions in FIG. 5. Accordingly, the solid-state image sensor 2 outputs the image signals in the portion with a heavy border in FIG. 5 to the analog processing unit 3. The number of pixels read out from the portion with a heavy border in FIG. 5 is 10×10 pixels, and can be displayed without any change at the display system.

The image signals are subjected to predetermined signal processing by the analog processing unit 3 and the digital processing unit 4, and are supplied to the peripheral device unit 5. The image of the portion with a heavy border in FIG. 5 is displayed on, for example, a display screen of the peripheral device unit 5.

Now, the twofold zoom image is displayed by the operator operating the operating unit 7. The zoom instructions are supplied to the controller 6, and the controller 6 drives and controls the solid-state image sensor 2 so as to perform reading out the subsampling ratio of 1, which is the hatched portion shown in FIG. 6. That is, the image signals of the 10×10 pixels indicated by the heavy border in FIG. 6 are output from the solid-state image sensor 2 to the analog processing unit 3.

The image signals read out are subjected to predetermined signal processing by the analog processing unit 3 and the digital processing unit 4, and are displayed on, for example, the display screen of the peripheral device unit 5. In this case as well, 10×10 pixels are read out from the solid-state image sensor 2, so the twofold zoom image shown in FIG. 6 can be displayed by the same signal processing as with the case in FIG. 5.

Also, with a case of recording the images in FIGS. 5 and 6, the number of pixels read out is the same, and accordingly can be recorded by a common recording process.

Now, the example in FIG. 5 wherein a predetermined one pixel is read out from 2×2 pixels has been described as the read-out method for the subsampling ratio of 2, but any arrangement is suitable as long as the properties of the 2×2 pixel area is reflected, and for example, a predetermined one-pixel signal may be obtained from an signal average value of the 2×2 pixels. In this case, the number of pixels selected from the image-taking area of 20×20 pixels of the solid-state image sensor 2 is 40×40 pixels, but the number of the pixels output is 10×10 pixels.

Now, let us say that the operator operates the operating unit 7 and specifies zooming of 20/14 times. Accordingly, reading out is performed from a 14×14 pixel area of the solid-state image sensor 2 at a subsampling ratio of 1, for example, by instructions from the controller 6. FIGS. 7A through 7C are for describing the reading out in this case. FIG. 7A illustrates that area of pixels of the solid-state image sensor 2 for reading out, FIG. 7B indicates the size of the image read out, and FIG. 7C indicates the output image size.

The areas A and B in FIG. 7A both indicate the same area as that with a heavy border in FIGS. 5 and 6. The area C in FIG. 7A indicates the read-out area as to the area A zoomed 20/14 times. With the present embodiment, reading out with the subsampling ratio of 1 is performed for reading out from the 14×14 pixel area C. Accordingly, 14×14 pixels worth of image signals are output from the solid-state image sensor 2 (FIG. 7B).

The analog processing unit 3 subjects that input image signals to the predetermined analog signal processing, performs digital conversion thereof, and outputs the signals to the digital processing unit 4. The digital processing unit 4 performs image size conversion processing, and converts the image size into 10×10 pixels. In this case, the 14×14 pixel image size is changed into 10×10 pixels by the same processing as that shown in FIG. 3A (FIG. 7C).

Other operations are the same as with taking images of the areas A and B, and following image size conversion and predetermined digital signal processing, the signals are supplied to the peripheral device unit 5 and displayed as an image, for example. Thus, the area of 14×14 pixels is zoomed 20/14 times, based on the example shown in FIG. 5, and is displayed with an image size of 10×10 pixels.

In this way, according to the present embodiment, an arbitrary zoom magnification is obtained by the image size conversion processing at the digital processing unit 4. Of course, it is needless to say that the number of pixels of the solid-state image sensor, the image size, subsampling ratio, etc., are not restricted to the values described in the above embodiment. Also, with the example in FIGS. 7A through 7C, the center of the area and the center of zooming is matched, but the center of the area and the center of zooming do not have to be matched.

Further, in the above embodiment, signals are read out from the pixels in the area C in the event of displaying the image of the area C, but an arrangement may be made wherein read-out is performed from an area larger than the area C. In this case, the signals read out from the solid-state image sensor 2 can be temporarily stored in memory, with only the signals of the area corresponding to the zoom magnification being read out from the memory. For example, an arrangement may be made wherein signals are read out from the same area of the solid-state image sensor 2 at all times, regardless of the zoom ratio. For example, reading out from the area A of the solid-state image sensor 2 at all times enables all cases wherein the zoom magnification is greater than 1 but smaller than 2.

Figure 8:
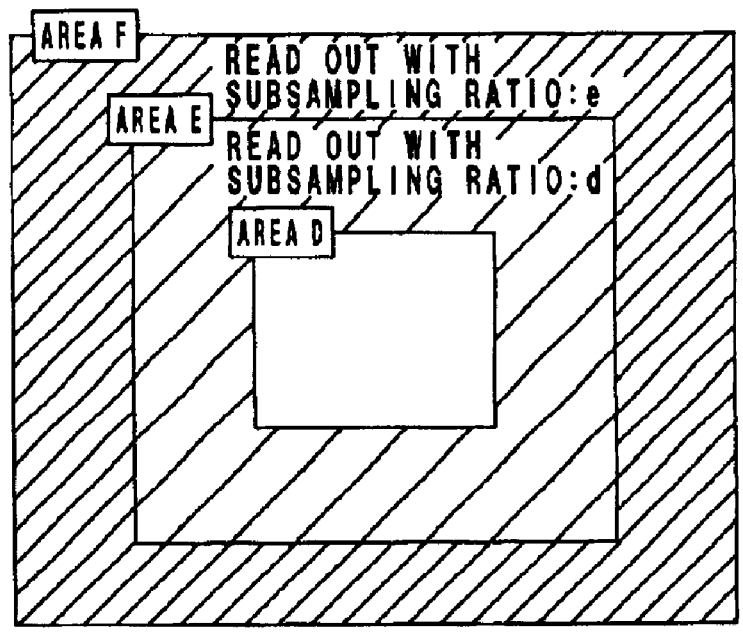
FIG. 8 is an explanatory diagram illustrating read-out in the event that three or more types of subsampling ratios are set.

While description has been made with regard to an example wherein the solid-state image sensor 2 may be read out while subsampling with two types of subsampling ratios, with reference to the FIGS. 7A through 7C, an arrangement wherein there are three or more types of subsampling ratios can be handled, as well. FIG. 8 is an explanatory diagram describing reading out in this case.

The area F in FIG. 8 indicates the readable maximum size (maximum subsampling ratio). Also, the area D in FIG. 8 indicates the area read out at the minimum subsampling ratio. The area E indicates an area that is intermediate in size between the areas F and D.

The reading out from the area F of the solid-state image sensor 2 is performed at the subsampling ratio of f. Also, the reading out from the areas E and D of the solid-state image sensor 2 is performed at subsampling ratios of e and d, respectively. The sizes of the area F, the area E, and the area D, are of the ratio f:e:d, wherein the number of pixels read out from the area F at the subsampling ratio f, the number of pixels read out from the area E at the subsampling ratio e, and the number of pixels read out from the area D at the subsampling ratio d, agree, and is a number of pixels corresponding to the requests of the display system are the like. In this case, in the event that image size conversion processing is not performed at the digital processing unit 4, zooming of f/e times is performed at the time of displaying the area E as compared to the time of displaying the area F, and in the same way, zooming of f/d times is performed at the time of displaying the area D as compared to the time of displaying the area F.

Then, as shown in FIG. 8, in the event performing display of an arbitrary area of a size between these areas F and E, the system controller 6 controls the solid-state image sensor 2 so as to read out at the subsampling ratio of e. Also, in the event performing display of an arbitrary area of a size between these areas E and D, the system controller 6 controls the solid-state image sensor 2 so as to read out at the subsampling ratio of d.

In the event performing display of an arbitrary area of a size between the areas F and E, the digital processing unit 4 converts the input signals into the image size requested by the display system or the like, by the same technique as that shown in FIGS. 7A through 7C. Also, in the event performing display of an arbitrary area of a size between the areas E and D as well, the digital processing unit 4 converts the input signals into the image size requested by the display system or the like, by the same technique as that shown in FIGS. 7A through 7C.

In this way, increasing the combinations of subsampling ratios allows multi-pixel solid-state image sensors to be handled. It is needless to say that the subsampling ratios f, e, and d can be arbitrarily set according to the number of pixels, and so forth.

Figure 9:
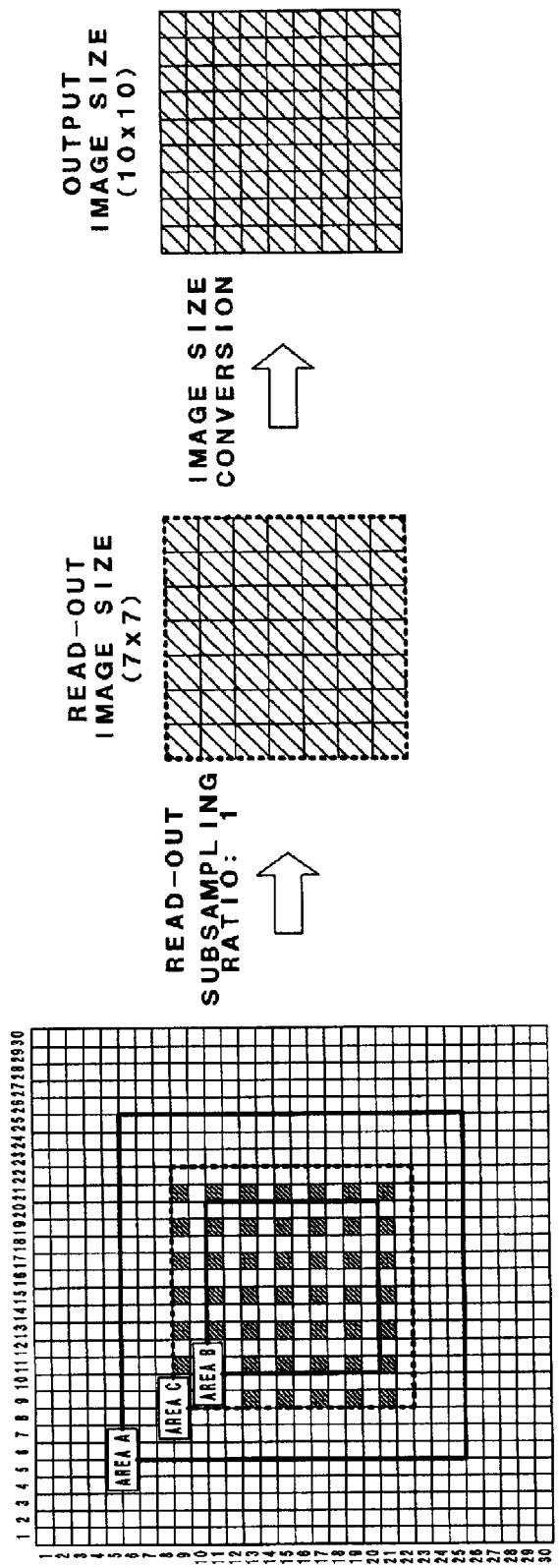
FIGS. 9A through 9C are explanatory diagrams illustrating zooming operations employed with an image-taking apparatus according to a second embodiment of the present invention.

FIGS. 9A through 9C are explanatory diagrams for describing the zooming operations employed with an image-taking apparatus according to a second embodiment of the present invention. FIG. 9A illustrates the area of pixels of the solid-state image sensor 2 for reading out, FIG. 9B indicates the size of the image read out, and FIG. 9C indicates the output image size. FIGS. 9A through 9C correspond to FIGS. 7A through 7C.

With the present embodiment, only the image size conversion processing of the digital processing unit 4 differs from that shown in FIG. 2, and the other configurations and operations are the same as those of the first embodiment. Accordingly, the operations for zooming with regard to the areas A and B wherein image size conversion processing is not involved, is the same as with the first embodiment.

Now, let us consider zoom display made with regard to the area C, which involves image size conversion processing. The areas A and B in FIG. 9A both indicate the same area as that with a heavy border in FIGS. 5 and 6. The area C in FIG. 9A indicates the read-out area as to the area A zoomed 20/14 times. With the present embodiment, the subsampling ratio of 2 is performed for reading out from the 14×14 pixel area C, in the same manner as when reading out from the area A. Accordingly, 7×7 pixels worth of image signals are output from the solid-state image sensor 2 (FIG. 9B).

The analog processing unit 3 subjects the input image signals to the predetermined analog signal processing, performs digital conversion thereof, and outputs the signals to the digital processing unit 4. The digital processing unit 4 performs image size conversion processing, and converts the image size into 10×10 pixels (FIG. 9C). In this case, the 7×7 pixel image size is changed into 10×10 pixels by the same processing as that shown in FIG. 3B.

Thus, the area of 7×7 pixels is zoomed 20/14 times, based on the example shown in FIG. 5, and is displayed with an image size of 10×10 pixels.

In this way, according to the present embodiment as well, advantages the same as those of the first embodiment can be obtained. The number of pixels read out from the solid-state image sensor 2 is small, so the speed of reading can be increased. The present embodiment is also the same as the first embodiment in that the number of pixels of the solid-state image sensor, the image size, subsampling ratio, etc., are not restricted to the values described in the above embodiment, and that the center of the area and the center of zooming do not have to be matched. Also, as with the first embodiment, an arrangement wherein there are three or more types of subsampling ratios can be handled, as well as two types of subsampling ratios. Also, an arrangement may be made wherein signals are read out at a constant size area, regardless of the size of the area, and converted to the image size requested by the display system or the like by image size conversion processing performed at the digital processing unit 4.

Figure 10:
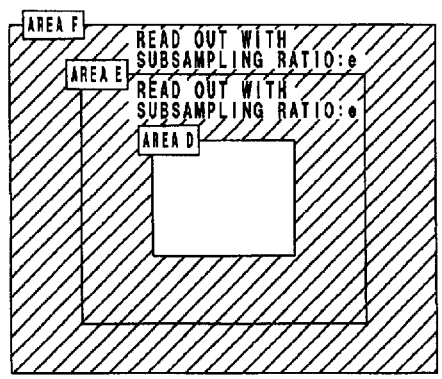
FIG. 10 is an explanatory diagram illustrating read-out in the event that multiple types of subsampling ratios are used.
Figure 11:
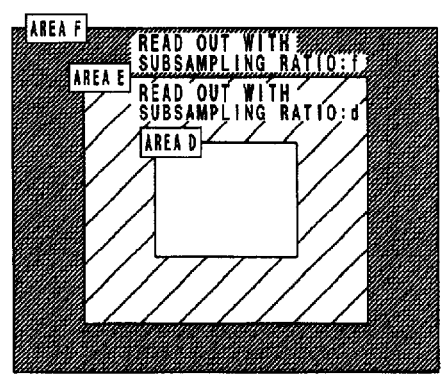
FIG. 11 also is an explanatory diagram illustrating read-out in the event that multiple types of subsampling ratios are used.

Also, the present embodiment may be applied to cases for subsampling with multiple types of subsampling ratios as with FIG. 8. FIGS. 10 and 11 are explanatory diagrams describing reading out in this case.

The area F in FIGS. 10 and 11 indicates the readable maximum size (maximum subsampling ratio), and the area D in FIGS. 10 and 11 indicates the area read out at the minimum subsampling ratio. The area E in FIGS. 10 and 11 indicates an area that is intermediate in size between the areas F and D.

FIGS. 10 and 11 correspond to FIG. 8, and reading out from the areas F, E, and D of the solid-state image sensor 2 is performed at the subsampling ratios of f, e, and d, respectively. Also, the sizes of the area F, the area E, and the area D, are of the ratio f:e:d, wherein the number of pixels read out from the area F at the subsampling ratio f, the number of pixels read out from the area E at the subsampling ratio e, and the number of pixels read out from the area D at the subsampling ratio d, agree, and is a number of pixels corresponding to the requests of the display system are the like.

In the example in FIG. 10, in the event performing display of either an arbitrary area of a size between the areas F and E or an arbitrary area of a size between the areas E and D, the system controller 6 controls the solid-state image sensor 2 so as to read out at the subsampling ratio of e.

Also, with the example in FIG. 10, in the event performing display of an arbitrary area of a size between the areas F and E, the digital processing unit 4 converts the input signals into the image size requested by the display system or the like, by the same technique as that shown in FIGS. 7A through 7C. Also, in the event performing display of an arbitrary area of a size between the areas E and D as well, the digital processing unit 4 converts the input signals into the image size requested by the display system or the like, by the same technique as that shown in FIGS. 9A through 9C.

In the example in FIG. 11, in the event performing display of an arbitrary area of a size between the areas F and E, the system controller 6 controls the solid-state image sensor 2 so as to read out at the subsampling ratio of f. Further, in the event performing display of any arbitrary area of a size between the areas E and D, the system controller 6 controls the solid-state image sensor 2 so as to read out at the subsampling ratio of d.

With this example, in the event performing display of an arbitrary area of a size between the areas F and E, the digital processing unit 4 converts the input signals into the image size requested by the display system or the like, by the same technique as that shown in FIGS. 9A through 9C. Also, in the event performing display of an arbitrary area of a size between the areas E and D as well, the digital processing unit 4 converts the input signals into the image size requested by the display system or the like, by the same technique as that shown in FIGS. 7A through 7C.

In this way, increasing the combinations of subsampling ratios allows multi-pixel solid-state image sensors to be handled with the second embodiment as well.

Figure 12A:
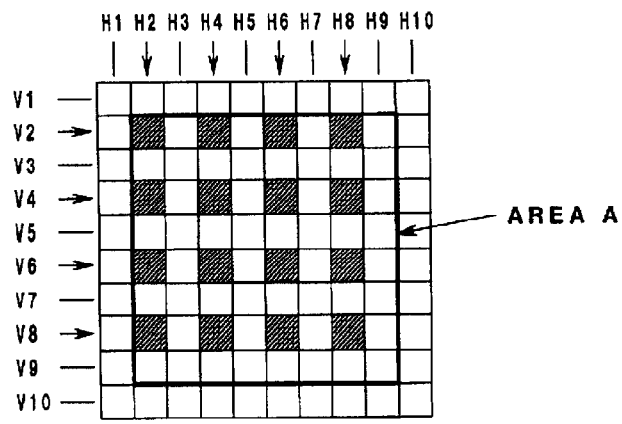
FIGS. 12A through 12C are explanatory diagrams illustrating zooming operations according to a third embodiment.
Figure 12B:
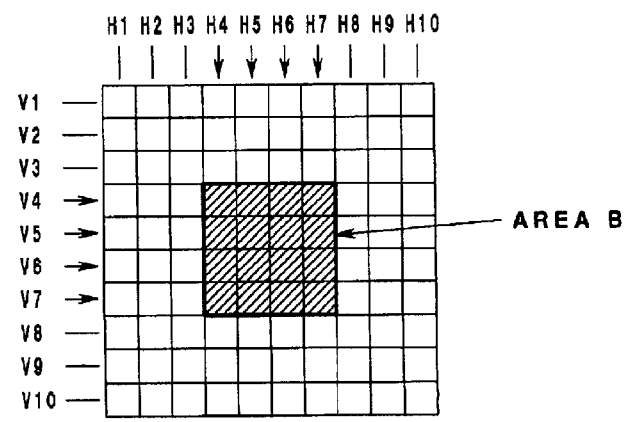
Figure 12C:
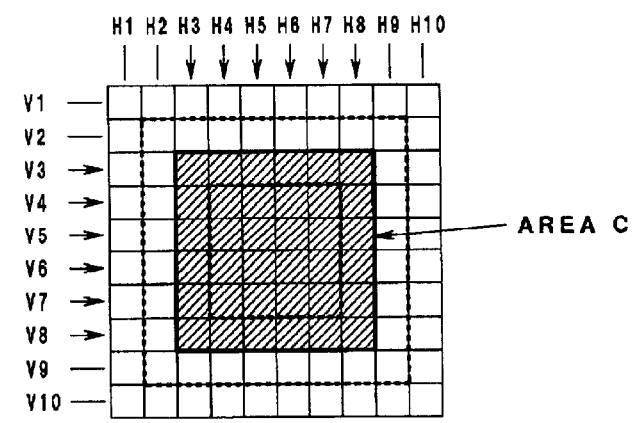
Figure 13:
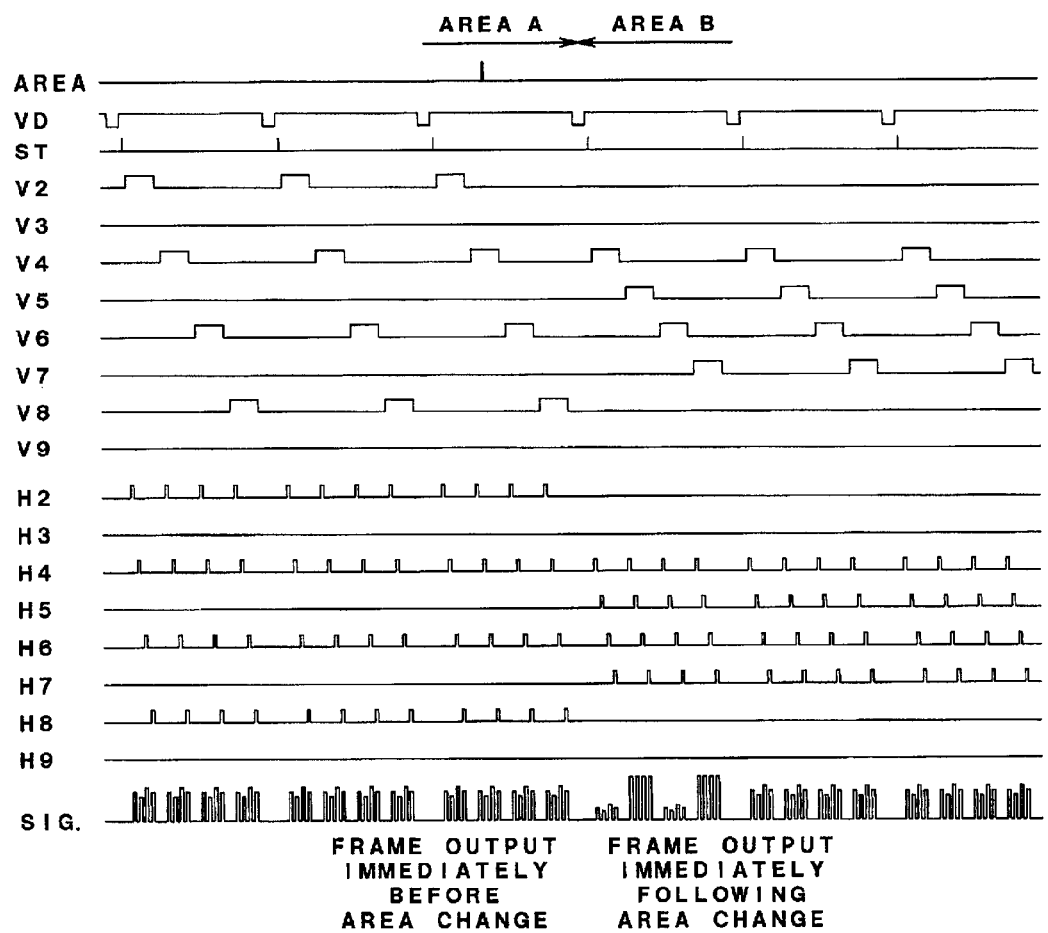
FIG. 13 is a timing chart illustrating the zooming operations employed with the third embodiment.

FIGS. 12A through 12C and FIG. 13 relate to a third embodiment of the present invention, wherein FIGS. 12A through 12C are explanatory diagrams illustrating zooming operations according to a third embodiment, and FIG. 13 is a timing chart illustrating the zooming operations employed with the third embodiment.

With the embodiment, only the driving method of the solid-state image sensor 2 by the system controller 6 differs from that shown in FIG. 2, and the other configurations and operations are the same as those of the first embodiment. The present embodiment is an arrangement wherein, in the event of a reading area from the solid-state image sensor 2 being changed, situations wherein two lines of image signals are simultaneously read out and suitable display is not performed, are prevented.

FIGS. 12A through 12C illustrate the area of the pixels of the solid-state image sensor 2 for reading out. Note that in the FIGS. 12A through 12C, the number of pixels of the photo-electric converter of the solid-state image sensor 2 is shown as being 10×10 pixels, to simplify the description. FIG. 12A illustrates wherein read-out is performed at a subsampling ratio of 2 from the area A of 8×8 pixels, FIG. 12B illustrates wherein read-out is performed at a subsampling ratio of 1 from the area B of 4×4 pixels, and FIG. 12C illustrates wherein read-out is performed at a subsampling ratio of 1 from the area C of 6×6 pixels.

With the read-out of the area A shown in FIG. 12A as a reference, a twofold zoomed image can be obtained by the read-out of the area B shown in FIG. 12B. Further, with regard to the area C shown in FIG. 12C, a 8/6 times zoomed image can be obtained with the read-out of the area A as a reference, by changing the image size to 4×4 pixels with the digital processing unit 4.

"Area" in FIG. 13 indicates a signal for instructing changing of the image-taking area, VD indicates a vertical synchronizing signal, and ST indicates a start pulse. V2 through V9 in FIG. 13 indicate the line selection signals corresponding to the lines V2 through V9 in FIGS. 12A through 12C, and H2 through H9 indicates column selection signals corresponding to the data column H2 through H9 in FIGS. 12A through 12C. Also, Sig. shown in FIG. 13 indicates a signal for reading out from the solid-state image sensor 2.

Now, let us say that the area A is being read at a subsampling ratio of 2. The reading operation of the area A starts by the start pulse ST shown in FIG. 13. The hatched pixels in the V2 line of the solid-state image sensor 2 are sequentially read out by the column selection signals H2, H4, H6, and H8 sequentially becoming high-level (hereafter referred to as "H") in the "H" period of the line selection signal V2. Next, the line selection signal V4 becomes "H", and the hatched pixels of the V4 line are read out. Subsequently, the signals of the pixels in the V6 and V8 lines are read out in the same manner.

As indicated by Area in FIG. 13, the image-taking area changes from area A to area B while reading out the V4 line. In this case as well, with the present embodiment, the read-out area is not changed until the reading out of the area being read out (area A) ends. As shown in FIG. 13, the system controller 6 activates the start pulse ST following generating of the vertical synchronizing signals VD after the V8 has changed from "H" to low-level (hereafter referred to as "L"). Accordingly, the read-out of the area B is then carried out.

That is to say, following generating of the start pulse ST, the line selection signal V4 becomes "H", and the pixels of the column H4 through H7 of the V4 line are sequentially read out. Subsequently, in the same say, the pixels for the V5 through V7 lines are sequentially read out. Accordingly, the pixels of the B area are read out.

In this way, according to the present embodiment, even in the event that an instruction for changing the image-taking area (i.e., Area being "H") occurs partway through reading out the area A, the reading of the area B is performed following the vertical scanning of reading out the area A. Accordingly, normal signals can be obtained from the frame signals immediately prior to the area change, without being affected by the instructions of change in area.

Figure 14:
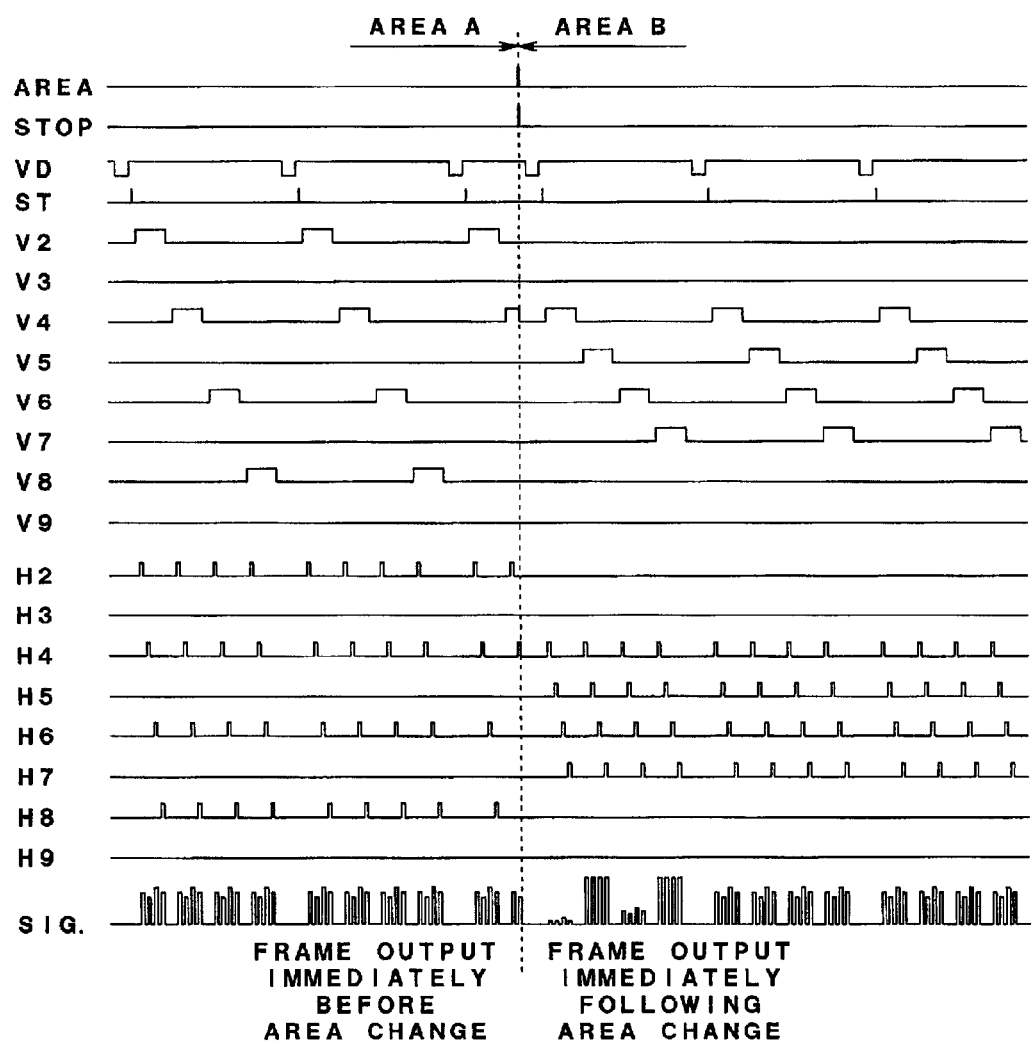
FIG. 14 is another timing chart illustrating the zooming operations employed with the third embodiment.

Also, with the present embodiment, normal signals can be obtained without being affected by the instructions of change in area, by force-quitting reading out from an area partway read out, immediately following changing of the area. FIG. 14 is a timing chart illustrating an example of this case. FIG. 14 corresponds to the items in FIG. 13, except that a stop signal STOP item has been added.

As shown in FIG. 14, the Area which instructs changing area becomes "H" partway through reading the V4 line. In the example in FIG. 14, the system controller 6 generates a STOP signal along with the Area signal, and force-quits reading out of the area A. Then, the system controller 6 generates a new vertical synchronizing signal VD, and starts reading out the area B with the start pulse ST.

In this case, a normal image cannot be created from a frame of pixels read out immediately before changing the area, but reading out of the area B begins immediately following the instructions to change the area, and accordingly is advantageous in that the amount of time for taking the image of the next area can be reduced. This is particularly advantageous in the event that there has been an area change instruction immediately following starting reading out.

Thus, the arrangement wherein signals are not read out at the time of changing the image-taking area enables normal signals to be output immediately following changing the area.

Figure 15:
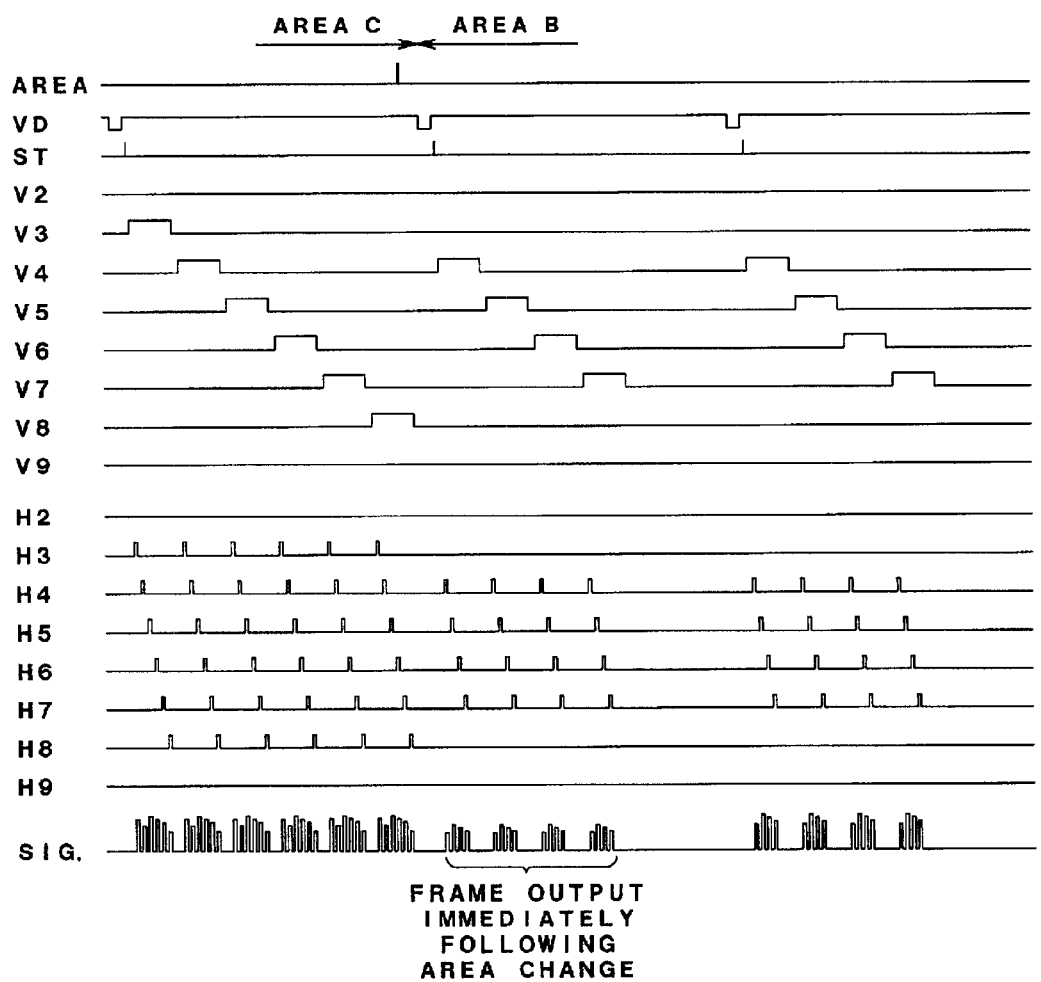
FIG. 15 is a timing chart illustrating the zooming operations employed with a fourth embodiment of the present invention.
Figure 16:
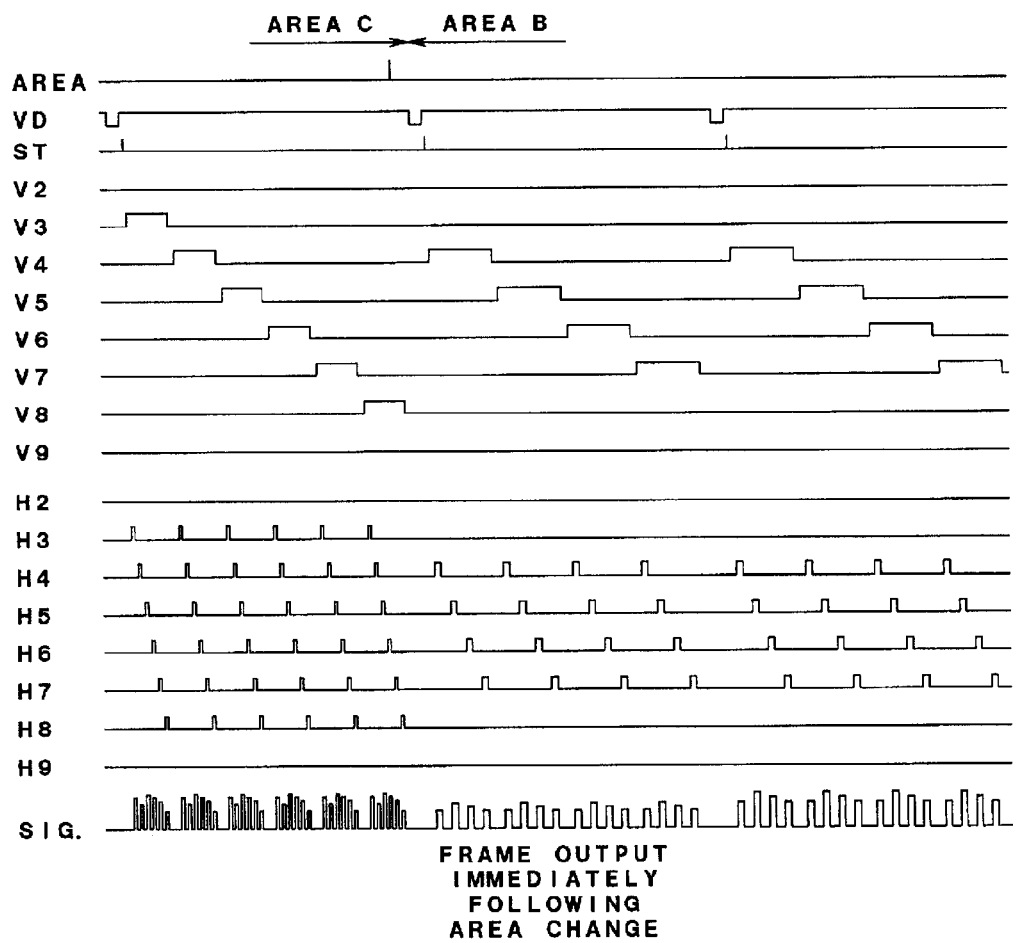
FIG. 16 is another timing chart illustrating the zooming operations employed with the fourth embodiment of the present invention.

FIGS. 15 and 16 are timing charts describing the zooming operations employed with a fourth embodiment of the present invention.

With the present embodiment, only the driving method of the solid-state image sensor 2 by the system controller 6 differs from that shown in FIG. 2, and the other configurations and operations are the same as those of the first embodiment.

In FIGS. 12A through 12C, there is no particular problem in the event that the image-taking area changes from area A to area B, but in the event that image-taking area changes between area A and area C or between area B and area C, the number of pixels read out differs, so the amount of time necessary for reading out the signals, i.e., the frame cycle, changes, and frame rate conversion processing becomes necessary to obtain a constant frame rate. Also, in the event of using an X-Y address type device wherein the accumulated time corresponds to the frame rate, the accumulated time for reading out differs between area A and area C and between area B and area C, so correction thereof is necessary.

FIGS. 15 and 16 are for describing read-out control of the solid-state image sensor 2, which makes correction of accumulated time, frame rate conversion processing, etc., unnecessary.

FIG. 15 illustrates the timing in the event of changing the read-out area from area C to area B. The system controller 6 scans the V3 line through the V8 line in shown FIG. 12C in one vertical cycle, as indicated by V3 through V8 in FIG. 15, upon reading out from the area C of the solid-state image sensor 2. Then, in the "H" period of the line selection signals V3 through V8, H3 through H8 are sequentially set to "H", sequentially reading out the pixels in the H3 column through H8 column in the lines.

Now, in the event that an Area occurs wherein the image-taking area is changed to the area B, the system controller 6 sequentially sets the line selection signals V4 through V7 and the column selection signals H4 through H7 corresponding to the area B to "H". In the area B, the number of pixels read out for each line is two pixels less than in the case of reading out from the area C, and also there are two lines fewer that are read out. However, with the present embodiment, the horizontal scanning periods and vertical scanning periods (frame cycle) of the area B and area C are made to be the same, by making the horizontal blanking period and the vertical blanking period at the time of reading out the area B to be longer than that at the time of reading out the area C.

Accordingly, the frame rate and the accumulated time of each of the pixels can be made to be the same for the time of reading the area B and the time of reading the area C. Thus, even in the event of performing reading out of difference pixel numbers, correction of accumulated time and conversion processing of frame rates becomes unnecessary.

FIG. 16 illustrates making the frame rate the same by changing the scanning frequency according to the read-out area. As shown in FIG. 16, the system controller 6 sets the length and cycle of the "H" period of the line selection signals V4 through V7 longer at the time of reading out the area B, as to the line selection signals V3 through V8 at the time of reading out the area C.

Also, the system controller 6 sets the length and cycle of the "H" period of the column selection signals H4 through H7 longer at the time of reading out the area B, as to the column selection signals H3 through H8 at the time of reading out the area C. Accordingly, the accumulated time of each of the pixels can be made to be the same even in the event that the image-taking area is changed between area B and area C, so correction of accumulated time and conversion processing of frame rates becomes unnecessary.

Figure 17:
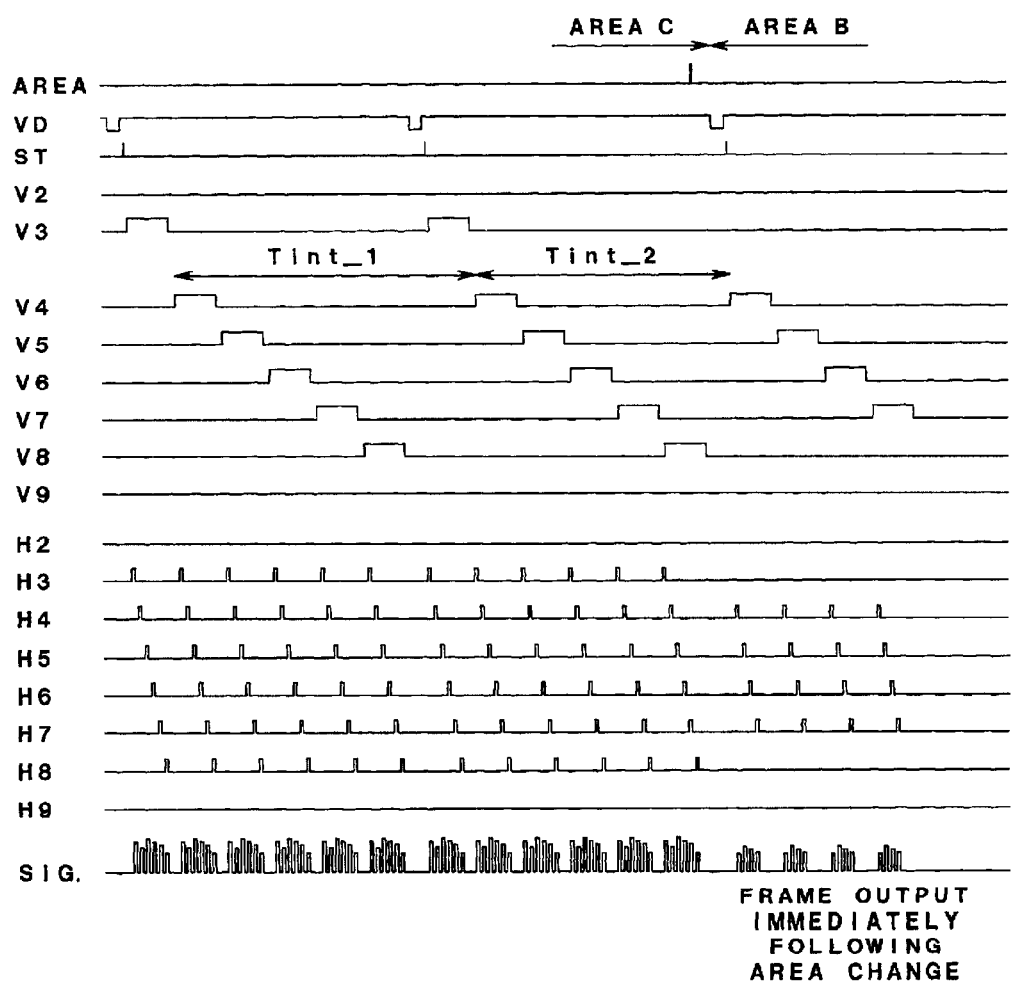
FIG. 17 is a timing chart illustrating the zooming operations employed with a fifth embodiment of the present invention.

FIG. 17 is a timing chart illustrating the zooming operations employed with a fifth embodiment of the present invention.

The present embodiment differs only with regard to the amplification processing control of the analog processing unit 3 or digital processing unit 4 by the system controller 6 shown in FIG. 2, and other configurations and operations are the same as the fourth embodiment shown in FIG. 15.

With an X-Y address type solid-state image sensor, in the event of performing reading and resetting sequentially by lines, the time from reading out a given line to reading the same line again is the accumulated time. However, the accumulation times differ between the lines immediately following changing of the image-taking area, as indicated by item Sig. in FIGS. 14 through 16, and normal frame signals cannot be obtained immediately following changing of the image-taking area.

Accordingly, disturbances in the image at the time of changing image-taking areas can be done away with by interpolating frame signals using the previous frame signals, instead of using frame signals immediately following changing of the image-taking area. In this case, performing interpolation using signals for one frame immediately before changing of the image-taking area is sufficient. Further, interpolation frames may be created by predicting movement in the event that there is movement of the subject for example, using several frames immediately before changing of the image-taking area.

However, the image quality deteriorates with interpolation processing using frames immediately before changing of the image-taking area. Accordingly, with the present embodiment, the frame signals immediately following changing of the image-taking area are corrected by computation processing according to the difference in the accumulation time.

The items in FIG. 17 are the same as the items in FIG. 15, and FIG. 17 indicates reading out with the same method as with FIG. 15. That is, in FIG. 17, the horizontal scanning periods are made to be the same before and following changing of the image-taking area by adjusting the horizontal and vertical blanking periods, in the event of changing from reading out from the area C to reading out from the area B.

The accumulated time of the pixels of the V4 line (see FIG. 12C) read out first at the time of starting to read out the area B is a period (accumulated time) Tint_2, indicated by the arrow in FIG. 17. In the reading out of the first one frame following changing of the area, the accumulated time of each of the pixels is generally this time Tint_2. The accumulated time for when reading out the area C and for reading out from the second frame on following image-taking area changing is the accumulated time Tint_1, indicated by the arrow in FIG. 17.

The output level of the solid-state image sensor 2 is generally proportionate to the accumulated time, so the system controller 6 controls the analog processing unit 3 or digital processing unit 4, and performs gain correction wherein the frame signals immediately following changing of the image-taking area are subjected to amplification processing by (Tint_1/Tint_2) as compared to signals of the other frames. Accordingly, frame signals immediately following changing of the image-taking area can be used.

With the present embodiment, frame signals immediately following changing of the image-taking area can be corrected without using frame interpolation, and normal images can be output immediately following changing of the image-taking area.

Note that while with the present embodiment, the frame signals immediately following changing of the image-taking area are corrected by gain correction corresponding to the ratio of the accumulated time, but it can be clearly understood that the frame signals immediately following changing of the image-taking area can be made to assume a normal value by controlling the accumulated time using a electrical shutter.

Now, OB (optical black) pixels are provided to the solid-state image sensor 2 so as to serve as a reference for clamping processing to the black level, at the light shielding portions, and OB clamping is performed by reading out the signals from the OB pixels. Description of the reading of the OB pixels has been omitted in the above embodiments, but the method disclosed in Japanese Unexamined Patent Application Publication No. 9-224196 can be employed as a method for reading out the OB pixels at all times, regardless of the scanning range of the photoreceptor pixels.

Figure 18:
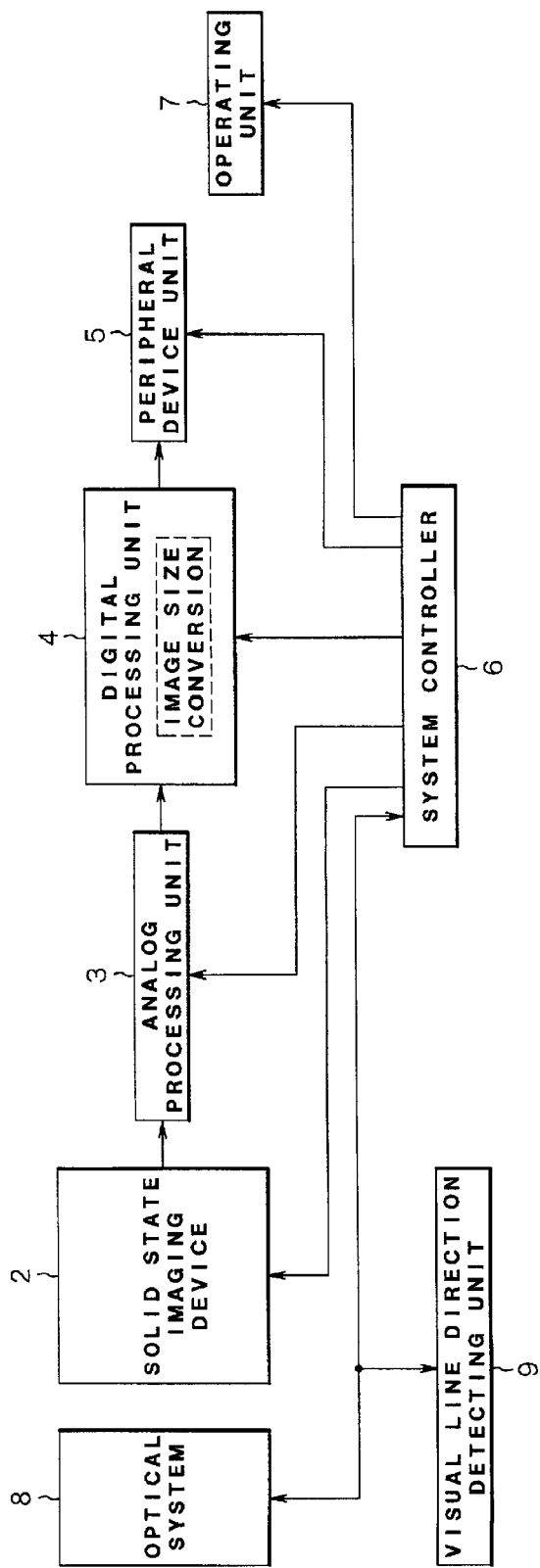
FIG. 18 is a block diagram illustrating an image-taking apparatus according to a sixth embodiment.
Figure 19:
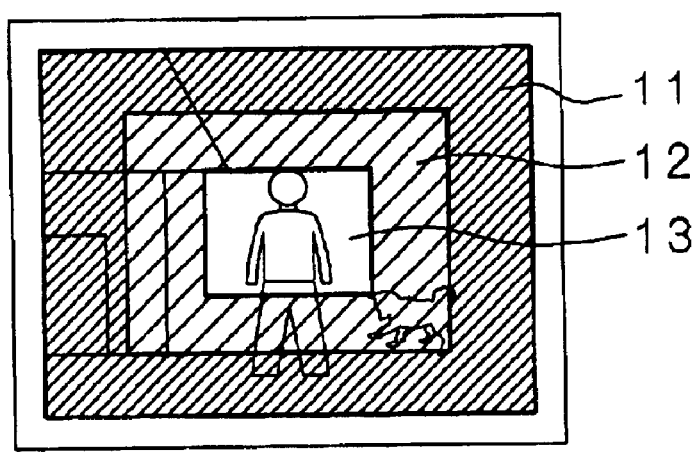
FIG. 19 is an explanatory diagram illustrating a visual line direction detecting unit 9 shown in FIG. 18.
Figure 20:
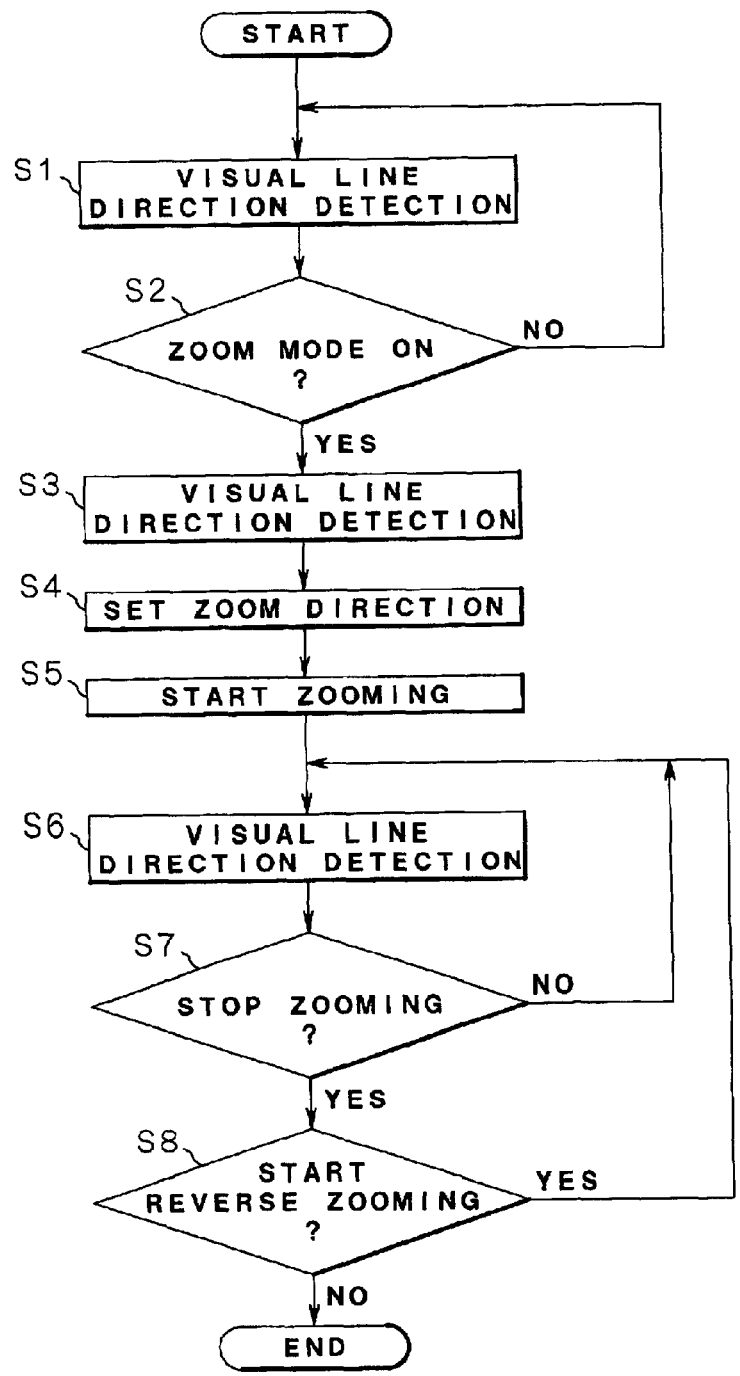
FIG. 20 is a flowchart illustrating the operations of the sixth embodiment.

FIGS. 18 through 20 relate to a sixth embodiment of the present invention, wherein FIG. 18 is a block diagram illustrating an image-taking apparatus according to the sixth embodiment, FIG. 19 is an explanatory diagram illustrating a visual line direction detecting unit 9 shown in FIG. 18, and FIG. 20 is a flowchart illustrating the operations of the sixth embodiment The components in FIG. 18 which are the same as the components in FIG. 2 have been denoted with the same reference numerals, and description thereof will be omitted.

The zooming operations in the above embodiments are performed by changing the read-out area of the solid-state image sensor 2, so the time required for changing the image-taking area is markedly shorter as compared to zooming operations with optical systems. Accordingly, the present embodiment enables zooming operations to be performed instantly using this characteristic, by obtaining zooming information by visual line direction detection.

The optical system 8 shown in FIG. 18 includes an image-taking optical system and a viewfinder optical system. The visual line direction detecting unit 9 detects the visual line of the operator as to a viewfinder making up the viewfinder optical system, with the detection results being output to the system controller 6. Also, zoom information is displayed on the viewfinder. The system controller 6 controls the zooming operations, and also controls display of the zoom information on the viewfinder, based on the detection results of the visual line direction detecting unit 9.

Now, visual line detection is disclosed in, for example, Japanese Unexamined Patent Application Publication No. 63-94232. This Publication discloses means for specifying AF or AE control areas by gazing at pictures in a viewfinder screen, and selecting and instructing by gazing at a selection display outside of the screen.

Also, as for the method for displaying zooming information on the optical viewfinder, there is a method wherein an LCD panel is built into the optical system making up the optical viewfinder, and controlling the electric field to be applied to the LCD panel based on the zooming information, thereby lowering the transmissivity of areas other than the output image.

Further, light shielding plates used for switching over to panorama modes with cameras may be provided within the optical system making up the optical viewfinder, thereby displaying zoom information by controlling the position of the light shielding plates based on the zooming information.

Next, the operation of the embodiment configured thus will be described with reference to the flowchart shown in FIG. 20.

First, the system controller 6 initializes the correspondence between the visual line direction detection results and the image read-out range. That is, in the event that the gaze point of the visual line obtained by the visual line direction detecting unit 9 is within a display angle of view, the system controller 6 changes the range in the image read out from the solid-state image sensor 2 so that the gaze point is positioned at the center of the angle of view. At the initial operation, the system controller 6 sets the angle of view to the widest possible angle of view.

In step S1, the system controller 6 detects the visual line direction, from the detection results of the visual line direction detecting unit 9, and switches the zoom mode on or off according to the detection results of the visual line direction. For example, with the display angle of view within the finder as a reference range, the zoom mode is turned on in the event that the visual line direction alternately switches between inside the angle of view and outside thereof.

Upon judging in step S2 that turning the zoom mode on has been instructed, in step S3 the system controller 6 obtains the detection results of the visual line direction, and sets the zooming direction (step S4). For example, in the event that gazing at the inside of the angle of view has been detected, the zooming direction is set to the telescopic side, and in the event that gazing at the outside of the angle of view has been detected, the zooming direction is set to the wide-angle side.

The system controller 6 starts zooming in step S5, and performs detection of the visual line direction indicating stopping zooming in steps S6 and S7. For example, in the event of detecting gazing at the outside of the angle of view at the time of zooming operations to the telescopic side, the system controller 6 stops the zooming operation, and in the event of detecting gazing at the inside of the angle of view at the time of zooming operations to the wide-angle side, stops the zooming operation.

In the event of stopping the zooming operation, the system controller 6 judges in the subsequent step S8 whether or not to start reverse-direction zooming. In the event that reverse-direction zooming is not to be started, the processing ends.

As for other methods for setting the zoom range, frames indicating zooming areas 11, 12, and 13 may be provided within the viewfinder beforehand, as shown in FIG. 19, so as to specify the zooming area (image-taking area) by detection which of the areas has been gazed at. Further, on and off marks may be provided outside of the angle of view for turning the zooming operations on and off, so as to specify these by detecting that these marks have been gazed at. Further, the zooming operation may also be turned off by looking away from the angle of view.

As described above, with the present embodiment, zooming operations are performed by detecting the visual line direction, thereby enabling extremely fast zooming operations. This is also advantageous in that the zooming state can be known at the optical viewfinder. That is, in the event of performing zooming operations by changing the read-out area of the solid-state image sensor, the output image and the image-taking angle of view differ, and the output image differs from the image in the optical viewfinder. With the present embodiment, the zooming information is displayed on the optical viewfinder, so the operator can readily know what the output image is, thereby markedly improving operability.

Also, with the present embodiment, the zooming operation control method by visual line detection results is by no means restricted to the above-described method. Also, the method for displaying the zoom information on the optical viewfinder is by no means restricted to the above-described method.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image-taking apparatus, comprising:
    a solid-state image sensor for performing image-taking with a plurality of photo-electric converters arrayed in a two-dimensional array;
    a first read-out control unit which reads out from said photo-electric converters in a predetermined image-taking area, for performing reading out at a fixed subsampling ratio according to the size of the image-taking area as to a plurality of set image-taking areas, thereby outputting images of each of the set image-taking areas at the same image size;
    a second read-out control unit which reads out from said photo-electric converters in a predetermined image-taking area, for performing reading out at said fixed subsampling ratio as to a predetermined image-taking area of a size that is different from those of said plurality of set image-taking areas; and
    an image size conversion processing unit for converting the image size of an image obtained by said second read-out control unit to the same image size as an image obtained by said first read-out control unit.

2. An image-taking apparatus according to claim 1, wherein said image size conversion processing unit converts image size by interpolation processing using the signals read out by said second read-out control unit.

3. An image-taking apparatus according to claim 1, wherein said second read-out control unit reads out at said fixed subsampling ratio as to a size of one of said set plurality of image taking areas, equivalent to a size closest to said predetermined image taking area to be read out.

4. An image-taking apparatus according to claim 1, wherein said second read-out control unit reads out at said fixed subsampling ratio as to a size of one of said set plurality of image taking areas, equivalent to a size closest to said predetermined image taking area to be read out and also a small size.

5. An image-taking apparatus according to claim 1, wherein said second read-out control unit reads out at said fixed subsampling ratio as to a size of one of said set plurality of image taking areas, equivalent to a size closest to said predetermined image taking area to be read out and also a large size.

6. An image-taking apparatus according to claim 1, wherein said second read-out control unit reads out at a same fixed subsampling ratio regardless to the size of said predetermined image taking area to be read out.

7. An image-taking apparatus according to claim 1, wherein at least one of said first and second read-out control units holds an image read out from said solid-state image sensor in memory, and reads out an image of a predetermined image area of said set plurality of image areas or of a different size from said set plurality of image areas from memory.

8. An image-taking apparatus according to claim 1, further comprising basic units wherein a plurality of color filters necessary for generating color signals are arrayed upon said photo-electric converter, wherein said first and second read-out control units read out in increments of said basic units.

9. An image-taking apparatus according to claim 1, wherein change in said image-taking area by at least one of said first and second read-out control units is performed at a timing wherein signals are not being read out from said solid-state image sensor.

10. An image-taking apparatus according to claim 9, wherein change in said image-taking area by at least one of said first and second read-out control units is performed following vertical scanning.

11. An image-taking apparatus according to claim 9, wherein change in said image-taking area by at least one of said first and second read-out control units is performed following forced quitting of read-out operations.

12. An image-taking apparatus according to claim 1, wherein said first and second read-out control units read out at the same frame rate.

13. An image-taking apparatus according to claim 12, wherein said first and second read-out control units have the same frame rate by changing the horizontal blanking period and the vertical blanking period.

14. An image-taking apparatus according to claim 12, wherein said first and second read-out control units have the same frame rate by changing the scanning frequency.

15. An image-taking apparatus according to claim 1, further comprising an interpolation processing unit for interpolating output frame signals using, of the output of said first and second read-out control units, the output before changing the image-taking area, immediately following changing of the image-taking area.

16. An image-taking apparatus according to claim 15, wherein said interpolation processing unit uses, of the output of said first and second read-out control units, the output frame signals immediately before changing the image-taking area, for interpolation.

17. An image-taking apparatus according to claim 1, further comprising a correction processing unit for correcting output frame signals immediately following changing of the image-taking area, of the output of said first and second read-out control units.

18. An image-taking apparatus according to claim 17, wherein said correction processing unit performs gain correction according to accumulated time before and after changing of said image-taking area, with regard to, of the output of said first and second read-out control units, the output frame signals immediately after changing the image-taking area.

19. An image-taking apparatus according to claim 17, wherein said correction processing unit performs correction of accumulated time with regard to, of the output of said first and second read-out control units, the output frame signals immediately after changing the image-taking area.

20. An image-taking apparatus according to claim 1, wherein said first and second read-out control units are capable of reading out from optical black pixels.

21. An image-taking apparatus according to claim 1, further comprising an optical viewfinder for displaying the image-taking area by said first and second read-out control units.

22. An image-taking apparatus according to claim 1, further comprising a visual line detecting device for detecting changes in the image-taking area by said first and second read-out control units.

23. An image-taking apparatus, comprising:
a solid-state image sensor for performing image-taking with a plurality of photo-electric converters arrayed in a two-dimensional array;
first read-out means which read out from said photo-electric converters in a predetermined area image-taking, for performing reading out at a fixed subsampling ratio according to the size of the image-taking area as to a plurality of set image-taking areas, thereby outputting images of each of the set image-taking areas at the same image size;
second read-out means which read out from said photo-electric converters in a predetermined image-taking area, for performing reading out at said fixed subsampling ratio as to a predetermined image-taking area of a size that is different from those of said plurality of set image-taking areas; and
image size converting means for converting the image size of an image obtained by said second read-out means to the same image size as an image obtained by said first read-out means.

24. An image-taking method, comprising:
a step of taking images with plurality of photo-electric converters arrayed in a two-dimensional array;
a step of reading out from said photo-electric converters in a predetermined image-taking area, in a normal mode, for performing reading out at a fixed subsampling ratio according to the size of the image-taking area as to a plurality of set image-taking areas, thereby outputting images of each of the set image-taking areas at the same image size;
a step of reading out from said photo-electric converters in a predetermined image-taking area, in a zoom mode, for performing reading out at said fixed subsampling ratio as to a predetermined image-taking area of a size that is different from those of said set plurality of image-taking areas; and
a step of converting the image size of an image obtained by reading out in said zoom mode to the same image size as an image obtained by reading out in said normal mode.

* * * * *